H. J. WICKHAM.
Envelope-Gumming Machine.

No. 217,311. Patented July 8, 1879.

Witnesses.
Lawrence F. Connor.
Jeremiah P. Cronin.

Inventor.
Horace J. Wickham,
by Crosby & Gregory, Attys

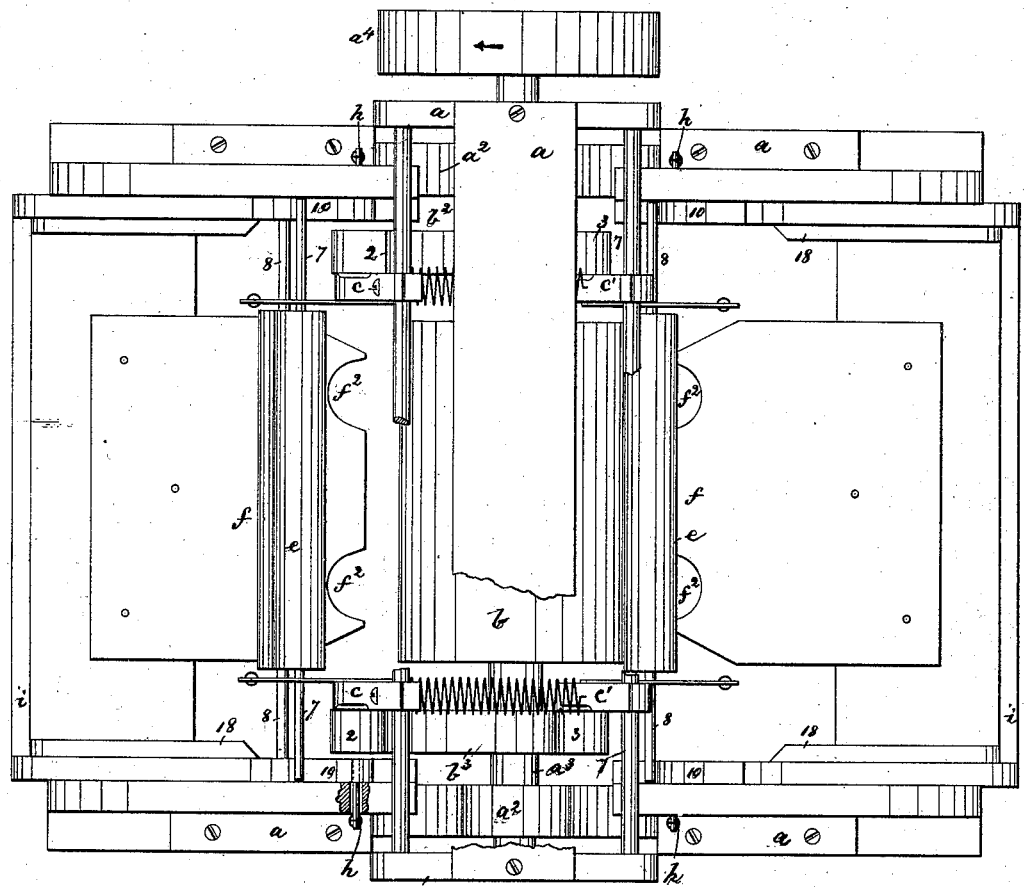

UNITED STATES PATENT OFFICE.

HORACE J. WICKHAM, OF HARTFORD, CONNECTICUT.

IMPROVEMENT IN ENVELOPE-GUMMING MACHINES.

Specification forming part of Letters Patent No. 217,311, dated July 8, 1879; application filed May 22, 1879.

*To all whom it may concern:*

Be it known that I, HORACE J. WICKHAM, of Hartford, county of Hartford and State of Connecticut, have invented an Improvement in Mechanism for Gumming Envelopes, of which the following description, in connection with the accompanying drawings, is a specification.

This invention relates to mechanism for gumming envelope-flaps, and is especially designed to gum certain portions of both sides of the flap—as, for instance, of an envelope such as described in United States Patent No. 204,422, dated June 4, 1878.

In this invention the machine is made duplex, so as to be fed from each end, the envelope seal-flap while being gummed by the gumming devices (shown as rollers) being supported on a so-called stencil-bed, it being composed of a thin sheet of metal cut away at proper places to permit the gumming devices above and below it to act, preferably, simultaneously against portions of opposite faces of the said flap, and apply gum at only the desired places.

Figure 1:
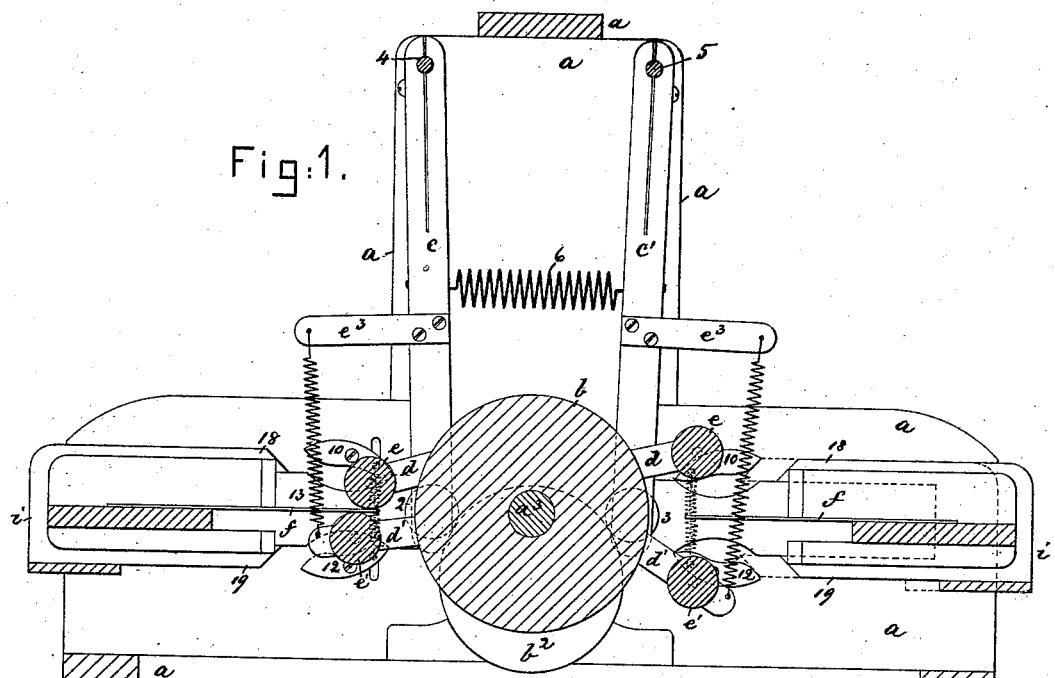
Figure 2:
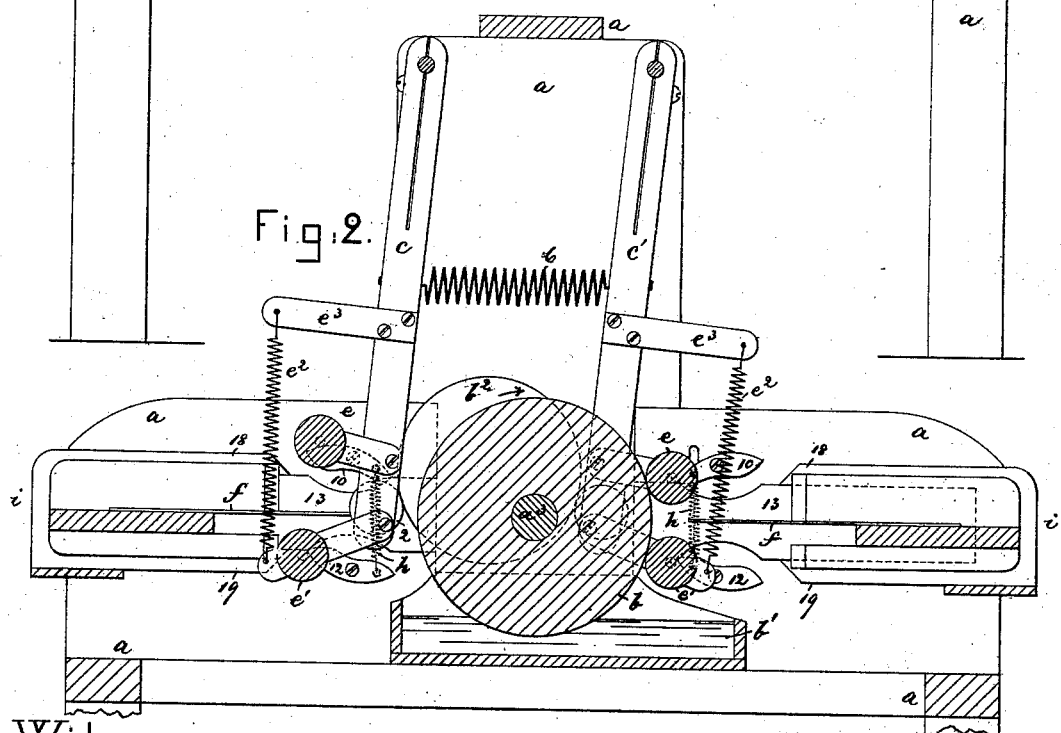

Figure 1 represents, in longitudinal vertical section, a machine containing my improvements, the gumming devices at the left being shown as in operative position for applying gum to the seal-flap of the envelope, while those at the right are thrown away from the stencil-bed preparatory to being moved backward away from the gum-box cylinder and to being closed upon a blank, the gum-box being removed. Fig. 2 is a similar section, showing the gum-box, the gumming devices at the right in contact with the gumming cylinder or roller, and those at the left almost in position to drop upon the stencil-bed to gum a blank thereon. Fig. 3 is a top view, a part of the frame being broken away; Fig. 4, a detail of the seal-flap of an envelope gummed as herein provided for.

The frame-work $a$, of suitable shape to sustain the working parts, has bearings $a^2$ for the main shaft $a^3$, driven by pulley $a^4$ in any usual way. Upon this shaft is placed the gum-box cylinder $b$, its lower portion running in the gum in the gum-box $b^1$. (See Fig. 2.)

The shaft $a^3$ has connected with it two eccentrics, $b^2$ $b^3$, which, during their rotation, act upon anti-friction rollers 2 3 of levers $c$ $c'$, pivoted at 4 5, and connected by springs 6, the latter acting to keep the rollers 2 3 of the said levers in contact with the eccentrics. Each of these levers (two at each end of the cylinder $b$) is shown as provided with two loosely-pivoted arms, $d$ $d'$, which serve as the bearings for the upper and lower gumming devices, (shown as rollers,) $e$ $e^1$. The lower arms, $d'$, and their gumming devices are held up toward the stencil-bed $f$ by a spring, $e^2$, connected with rigid arms $e^3$; but the upper arms and their gumming devices are shown as free to fall toward the said stencil-bed by the action of gravity, the said gumming devices $e$ $e^1$ approaching the said stencil-bed when free to do so. The shafts 7 8 of the gumming devices or rollers (see Fig. 3) are extended far enough to ride upon the separating-cams 10 12, pivoted, shaped as shown in the drawings, and placed above and below a guide-block, 13.

The cams 10 12 are connected by springs $h$, which keep their ends next the gum-box roller closed down against the guide-block 13.

The stencil-bed $f$, (see Fig. 3,) composed, preferably, of thin sheet metal, has its front end cut away, as at $f^2$, leaving spaces through which the lower gumming device may work to apply gum to the under or outer surface of the seal-flap of an envelope supported upon the said stencil-bed, while the upper gumming device is permitted to come in contact with the uppermost or inner surface of the said seal-flap.

In operation the seal-flap of an envelope is supported by the front part of the stencil-bed.

When the gumming devices are in contact with the gum-box roller, as at the right of Fig. 2, they are supplied with gum. The eccentrics $b^2$ $b^3$ then begin to operate, forcing the levers $c'$ backward, the ends 7 8 of the journals of the rollers $e$ $e^1$ at the right of Fig. 2, then riding along the convexed portions of the separating-cams 10 12, the rollers separating, as shown at right of Fig. 1.

When the frame $c'$ is completely thrown back, the ends of the shafts 7 8 pass beyond the ends of and fall from the separating-cams 10 12.

The gumming devices at the left of Fig. 2 illustrate the position they will occupy when almost ready to fall from the said cams 10 12, and when they do fall they come as closely together as possible, being separated only by the stencil-bed and the seal-flap of the envelope.

The gumming devices having passed from the ends of the cams 10 12 most remote from the gum-box roller, the ends of the shafts 7 8, as the arms carrying them are drawn toward the gum-box by the springs 6, pass directly between the cams 10 12 and the guide-block 13, the upper gumming devices rolling along over and gumming the seal-flap on its inner side for its whole width, whereas the lower gumming device, $e^1$, applies gum only to that portion of the outer side of the seal-flap which is exposed through the openings or spaces $f^2 f^2$, leaving the outer side of the said seal-flap gummed only, as designated by the dotted lines, Fig. 4.

To prevent the gumming devices from descending upon the envelope or stencil-bed $f$, I have provided the machine with locking devices $i$, having wedges or fingers 18 19, which may be moved forward, as shown in dotted lines at right of Fig. 1.

This machine is fed by two persons, one at each side of it, who place the envelopes upon and remove them from the stencil-bed at the proper time, one person at one side of the machine removing one gummed envelope, while the person at the other side of the machine places on the stencil-bed an envelope to be gummed.

In this duplex machine, each half-rotation of the shaft $a^3$ gums the seal-flap of one envelope on both its faces.

I claim—

1. In an envelope-gumming machine, the stencil-bed or support for the part of the envelope to be gummed, combined with gumming devices, substantially as described, above and below the said bed, to gum both sides of the seal-flap of the envelope, as and for the purpose set forth.

2. The revolving gumming devices and their pivoted arms, the cams 10 12, and mechanism, substantially as described, to operate the gumming devices, combined with the stencil-bed and gum-supplying roller and gum-box, substantially as described.

3. In an envelope-gumming machine, the combination, with one gum-box roller, of two sets of gumming devices, and two stencil-beds at opposite sides of the gum-box roller, and mechanism, substantially as described, to operate both sets of gumming devices, to enable two seal-flaps to be gummed at opposite surfaces during each rotation of the gum-box roller, substantially as described.

In testimony whereof I have signed my name to this specification in the presence of two subscribing witnesses.

HORACE J. WICKHAM.

Witnesses:
FRANCIS T. NICHOLSON,
G. W. GREGORY.